(12) United States Patent  
Bock et al.

(10) Patent No.: US 6,860,829 B2  
(45) Date of Patent: Mar. 1, 2005

(54) PLAY-FREE STEERING GEAR

(75) Inventors: Michael Bock, Asperg (DE); Willi Nagel, Remseck/Hochdorf (DE); Rolf Knecht, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/399,289

(22) PCT Filed: Sep. 11, 2001

(86) PCT No.: PCT/DE01/03476

§ 371 (c)(1),  
(2), (4) Date: Aug. 27, 2003

(87) PCT Pub. No.: WO02/32741

PCT Pub. Date: Apr. 25, 2002

(65) Prior Publication Data

US 2004/0029671 A1 Feb. 12, 2004

(30) Foreign Application Priority Data

Oct. 17, 2000 (DE) .......................... 100 51 306

(51) Int. Cl.$^7$ .......................... B60D 11/06; F16H 35/00; B62D 5/04
(52) U.S. Cl. ....................... 475/18; 74/388 PS; 74/422; 180/443
(58) Field of Search ................. 475/18, 19; 74/388 PS, 74/420, 422, 409; 180/433–446

(56) References Cited

U.S. PATENT DOCUMENTS

| 5,341,701 A | * | 8/1994 | Krom et al. .................. 74/499 |
| 5,355,821 A | * | 10/1994 | Johnson .................. 114/144 R |
| 5,615,581 A | * | 4/1997 | Cordioli ...................... 74/494 |
| 6,145,400 A | * | 11/2000 | Garza .......................... 74/422 |
| 6,357,314 B1 | * | 3/2002 | Sommer ................. 74/388 PS |
| 6,454,044 B1 | * | 9/2002 | Menjak et al. .............. 180/444 |

FOREIGN PATENT DOCUMENTS

| DE | 3835947 A1 | * | 4/1990 | ............ B62D/3/12 |
| DE | 43 34 491 A | * | 4/1995 | |
| FR | 2 375 772 A | * | 7/1978 | |
| JP | 08301129 A | * | 11/1996 | ............ B62D/3/12 |
| WO | WO 99 11502 A | * | 3/1999 | |
| WO | WO 99 65758 A | * | 12/1999 | |

OTHER PUBLICATIONS

Patent Abstracts of Japan, vol. 017, No. 306, (M–1428), Jun. 11, 1993 (Jun. 06, 1993) & JP 05 026330 A (Matsushita Electric Ind Co. Ltd.), Feb. 2, 1993.*

* cited by examiner

Primary Examiner—Tisha Lewis  
(74) Attorney, Agent, or Firm—Ronald E. Greigg

(57) ABSTRACT

A gear for vehicle steering systems, in which, by pivoting a shaft of a pinion in the radial direction by means of a spring element, play-free transmission of the rotary motion from the shaft to a power takeoff shaft is assured.

20 Claims, 4 Drawing Sheets

PLAY-FREE STEERING GEAR

CROSS-REFERENCE TO RELATED APPLICATIONS

This application is a 35 USC 371 application of PCT/DE 01/03476 filed on Sep. 11, 2001.

BACKGROUND OF THE INVENTION

1. Field of the Invention

The invention relates to a gear for a vehicle steering system, having a pinion disposed on a shaft in a manner fixed against relative rotation, having a gear wheel that meshes with the pinion, the pinion and the gear wheel being prestressed in the radial direction.

2. Description of the Prior Art

Conventional vehicle steering systems, vehicle steering systems with an overriding gear, and steer-by-wire steering systems require one or more steering gears with which the rotary motion of the steering wheel is converted into a rotary motion of the steered wheels.

In conventional electric power steering systems, a torque brought to bear by an electric motor must be input into the steering system as well. In a steer-by-wire steering system, there is no mechanical or hydraulic connection between the steering wheel and the steered vehicle wheels. A steering actuator regulates the position of the steered vehicle wheels as a function of the driver's steering demand and such other variables as the yaw rate or the vehicle speed. The steering motion of the steered wheels can be programmed freely, and all the steering work is brought to bear by the electrical or hydraulic steering actuator.

In vehicle steering systems with an overriding gear, a conventional steering system is combined with an overriding gear, so that steering interventions can be made independently of the driver's steering demand. The properties of a steer-by-wire steering system are achieved most extensively in this way.

In these gears, play is unwanted, since it makes the steering feel worse, makes the steering interventions less precise, and moreover it makes itself felt unpleasantly in the form of "cracking noises" when there is a change in the direction of rotation.

To avoid play in the steering gears named above, it is known from German Patent Disclosure DE-OS 198 22 478 A1 to support the pinion of a worm gear axially displaceably and to prestress it resiliently in the axial direction. As a result, any play that exists in the steering gear is not reduced; instead, the occurrence of the aforementioned "cracking noises" is merely partly prevented, since after a change in the direction of rotation, when the pinion strikes the worm wheel it can deviate in the axial direction, thus lessening the impact. A disadvantage of this steering gear is that the precision of the steering motion suffers, and a compensation in length is necessary between the pinion shaft and the electric motor that drives the pinion shaft.

From International Patent Disclosure WO 99/11502, it is also known to support the pinion shaft of a worm gear of an electrical servo unit in an eccentric sleeve, so that in assembly the play of the worm gear can be adjusted. A disadvantage of this version is that wear of the gear wheels and/or of their bearing can increase play over the course of time, so that the cracking noises increase.

From Japanese Patent Disclosure JP-OS 10 281 235 A, it is known for the pinion of an electrically driven worm gear to be mounted in prestressed form in an elastic bearing formed by a rubber O-ring disposed between the pinion bearing and the housing. In this gear, no play occurs, and gear wear is automatically compensated for. However, it is disadvantageous in this version that an O-ring ages over time, so that the prestressing decreases. Moreover, the pinion can be deflected not only in the radial direction but also in a tangential direction, which lessens the steering precision.

From Austrian Patent Application Serial No. 199 44 133.2 (filed in Austria on Sep. 15, 1999) of ZF Lenksysteme GmbH, which had not yet been published by the filing date of the present application, an electrical servo unit is known in which the shaft on which the pinion of a worm gear is secured is supported at three points. One of the three bearings is displaceable in the radial direction. Exerting a spring force in the radial direction elastically deforms the shaft, thus assuring play-free engagement of the pinion with the worm wheel. However, in addition to the torsional stresses resulting from the operation of the steering gear, the shaft must also absorb a revolving bending stress.

The object of the present invention is therefore to furnish a self-adjusting gear for a vehicle steering system, which is play-free, which at least does not increase the stresses on components, and which assures high steering precision.

This object is attained according to the invention by a gear for a vehicle steering system, having a pinion disposed on a shaft in a manner fixed against relative rotation, having a gear wheel that meshes with the pinion, the pinion and the gear wheel being prestressed in the radial direction, and in which the shaft is supported pivotably in the radial direction.

SUMMARY OF THE INVENTION

By the pivoting motion of the shaft in the radial direction, a play-free engagement between the pinion and the gear wheel can be established, which can be compensated for readily even if wear occurs to the gear wheel bearings or to the gear wheels. No additional stresses on the gear components occur. It is also possible simply and precisely to define the contact pressure between the pinion and the gear wheel, so that the gear friction is no greater than absolutely necessary, and thus the restoration of the vehicle steering system to the center position is not significantly hindered. Moreover, the pinion cannot be displaced in the axial direction, and this enhances the steering precision.

The object stated above is also attained by a gear for a vehicle steering system, having a pinion disposed on a shaft in a manner fixed against relative rotation, having a rack that meshes with the pinion, the pinion and the rack being prestressed in the radial direction, and in which the shaft is supported pivotably in the radial direction. In this rack-and-pinion gear according to the invention, the aforementioned advantages come into play in the same way.

In a variant of the invention it is provided that the shaft is supported in a housing by means of a fixed bearing and at least one movable bearing; and that the movable bearing or movable bearings are displaceable in the radial direction in the housing, and/or that the housing has an oblong movable bearing for receiving the movable bearing; and that the longitudinal axis of the oblong movable bearing extends in the radial direction. In this variant, the pivoting motion of the shaft is predetermined by the oblong movable bearing. Deviation of the shaft in the tangential direction is not possible. Moreover, from a production standpoint, an oblong movable bearing is easy to make.

In a further feature of the invention, the movable bearing is braced against the housing via a support ring, so that the movable bearing is not acted upon with linear radial loads, and the guidance of the movable bearing in the housing is improved.

In a further feature of the invention, between the movable bearing and the housing, or between the support ring and the housing, at least one spring element is provided, in particular a spiral spring or a cup spring, so that a defined prestressing between the pinion and the gear wheel or rack can be established in a simple, economical way. The prestressing force depends essentially on the spring rate of the spring element or elements, and depends only slightly on the production variations of the support ring and the housing.

In another embodiment of the invention, a rotation preventer is mounted between the movable bearing and the housing, or between the support ring and the housing, so that the movable bearing cannot rotate in the housing, which could lead to functional impairments.

In a further feature of the invention, the pinion is disposed on the rotor shaft of an electric motor in a manner fixed against relative rotation, so that the number of components is reduced, and an especially compact construction of the gear of the invention becomes possible.

The gear of the invention can be a worm gear, a spur gear with external toothing or internal toothing, a spur gear with a rack, a bevel gear, a planetary gear, or a spiral gear, so that the advantages of the invention come into play for all types of gears. Moreover, the pinion and the gear wheel or rack can be spur-toothed or helical-toothed.

Finally, the gear of the invention can be used in a servo unit of an electric power steering system, in a rack-and-pinion steering gear, in a steering actuator with an overriding gear, and/or as an electric motor steering actuator of a steer-by-wire steering system.

BRIEF DESCRIPTION OF THE DRAWINGS

Exemplary embodiments of the invention are described herein below, in conjunction with the drawings, in which.

DESCRIPTION OF THE PREFERRED EMBODIMENTS

Figure 1:
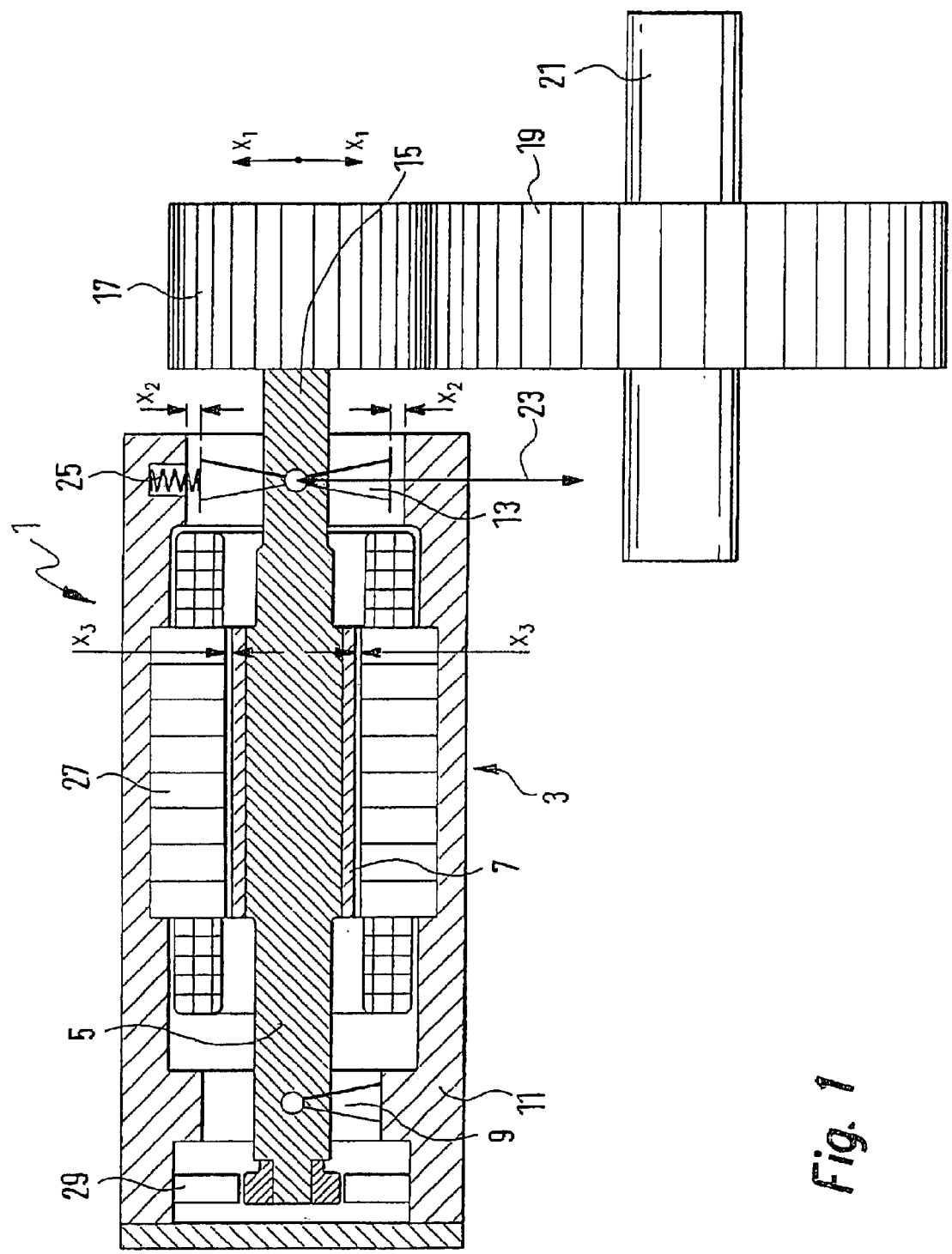
FIG. 1 is a first exemplary embodiment of a spur gear of the invention with external toothing.

In FIG. 1, a first exemplary embodiment of a gear 1 of the invention with spur toothing. The gear 1 comprises an electric motor 3, with a shaft 5 that carries a rotor 7. The shaft 5 is supported by one end with a fixed bearing 9, shown only schematically, in a housing 11 of the electric motor 3. On the opposite end of the electric motor 3, there is a movable bearing 13. A pinion 17 is secured in a manner fixed against relative rotation to a journal 15 of the shaft 5. The pinion 17 is thus cantilevered on the shaft 5 and meshes with a gear wheel 19, which is secured to a power takeoff shaft 21. The bearing of the power takeoff shaft 21 is not shown in FIG. 1.

To prevent play in the toothing between the pinion 17 and the gear wheel 19, the shaft 5 can be pivoted about the fixed bearing 9 in the direction of the arrows $X_1$. The pivoting motion of the shaft 5 is made possible by the fact that the movable bearing 13 is secured displaceably in the housing 11 in the radial direction, which is represented by an arrow 23. A spring element 25 embodied as a spiral spring presses the pinion 17 onto the gear wheel 19, so that a play-free transmission of the rotary motion of the electric motor 3 to the power takeoff shaft is effected. The spring rate and prestressing of the spring element 25 should be dimensioned such that, regardless of the direction of rotation and the torque of the electric motor 3, the forces that occur between the tooth flanks of the pinion 17 and the gear wheel 19 cannot pivot the shaft 5 counter to the spring force of the spring element 25. On the other hand, care must be taken that the spring force of the spring element 25 be no greater than necessary, in order to prevent the gear of the invention from becoming sluggish and to prevent excessive wear.

To assure the function of the electric motor 3, it is necessary for the pivoting distance $X_2$ of the movable bearing 13 to be dimensioned such that the rotor 7 cannot grind on a stator 27 of the electric motor. Moreover, care must be taken to assure that any brushes 29 that may be resent in the electric motor 3, or rotary angle sensors, not shown, will not be impaired in their function by the pivoting of the shaft 5. This means that the gap $X_3$ between the rotor 7 and the stator 27 must be dimensioned such that once the displacement distance $X_2$ of the movable bearing 13 has been used up, no contact takes place between the rotor 7 and the stator 27.

The brush 29 or the rotary angle sensors, not shown, are therefore preferably disposed in the vicinity of the fixed bearing 9. In the region of the movable bearing 13, the housing 11 of the electric motor 3 has an oblong movable bearing, which is longer by twice the amount X2 than the diameter of the movable bearing 13.

Figure 2:
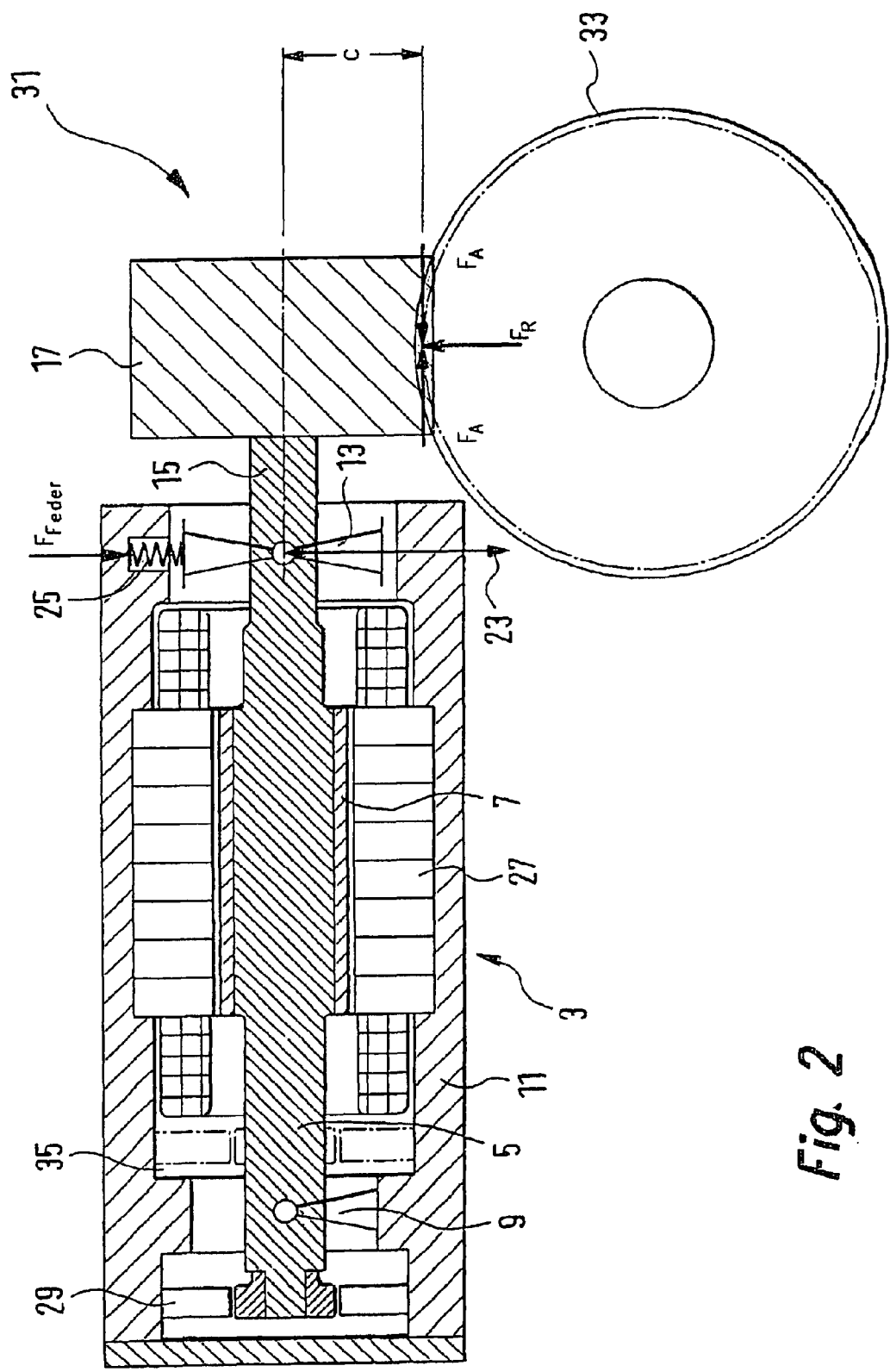
FIG. 2 is a second exemplary embodiment of a worm gear of the invention.

FIG. 2 shows a second exemplary embodiment of the invention, in the form of a worm gear 31. Identical components are provided with the same reference numerals, and what is described for one exemplary embodiment applies accordingly. For the sake of simplicity, in FIG. 2 the arrows $X_1$, the pivoting distance $X_2$, and the gap $X_3$ between the rotor 7 and the stator 27 are not shown again. However, what is said for the first exemplary embodiment applies to the second exemplary embodiment as well. In FIG. 2, a further possible installation site 35 for brushes 29 or rotary angle sensors, not shown, is indicated.

When the pinion 17 transmits a torque to the worm wheel 33, a radial force $F_R$ is created. The radial force $F_R$ acts counter to the spring force $F_{Spring}$ of the spring element 25. Moreover, as a result of the transmission of the torque from the pinion 17 to the worm wheel 33, an axial force $F_A$ is also created. Depending on the direction of rotation, the axial force $F_A$ changes its direction. The spring element 25 must be dimensioned such that the contact-pressure moment $F_{Spring} \times a$ of the spring element 25 is greater than the moment $(F_R \times b - F_A \times c)$.

In types of toothing that are free of axial force, as in the case of herringbone toothing, no axial force $F_A$ occurs, and so the selected spring force $F_{Spring}$ of the spring element 25 can be correspondingly less. As a result, less friction occurs, and the contact pressure is independent of the direction of rotation of the electric motor 3.

Figure 3:
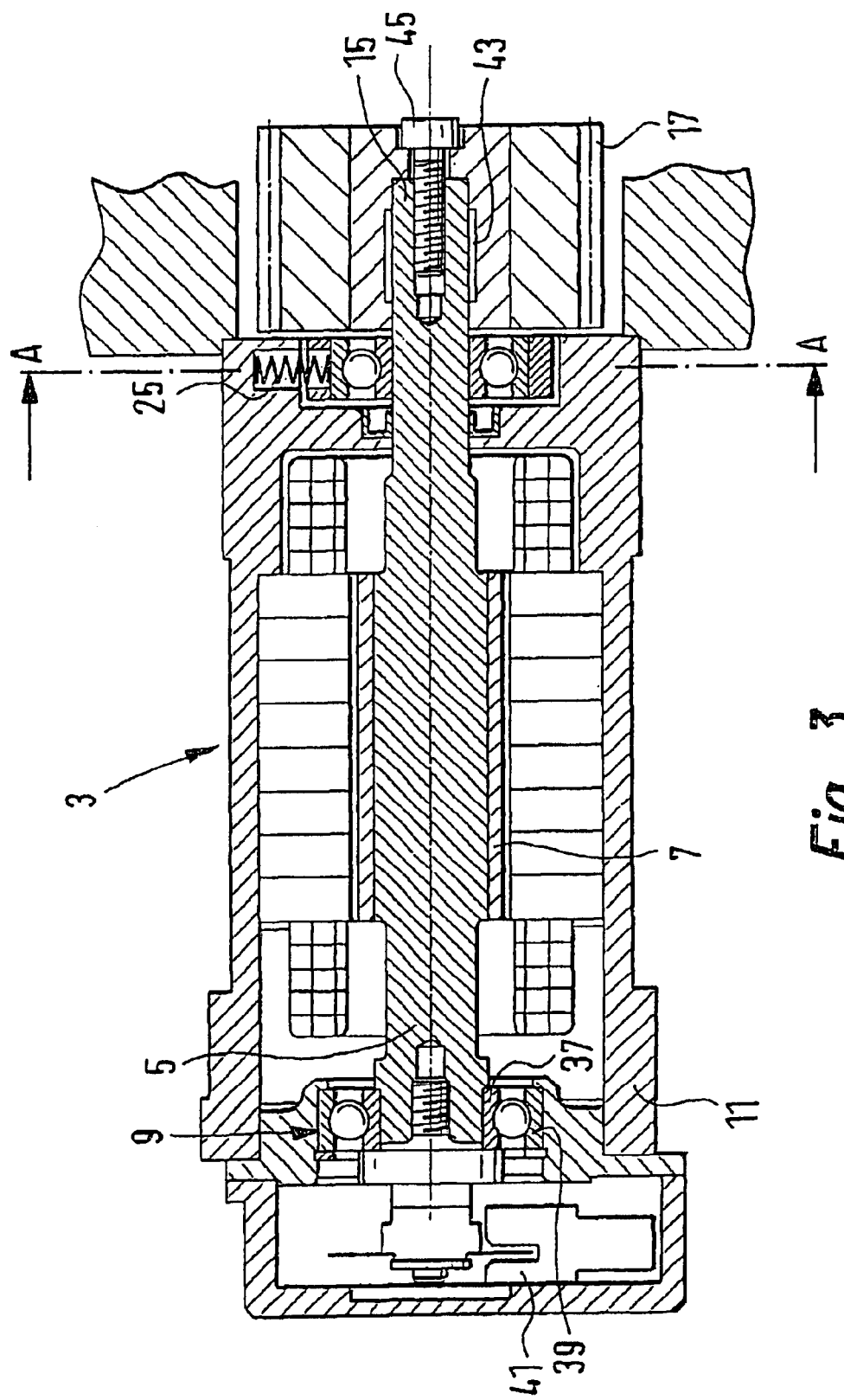
FIG. 3 is a detail of a shaft bearing of the invention.

In FIG. 3, a structural embodiment of the first exemplary embodiment is shown in somewhat more detail. The fixed bearing 9 and the movable bearing 13 are embodied as deep groove ball bearings. An inner ring 37 of the fixed bearing 9 is connected to the shaft 5 by a press fit. An outer ring 39 of the fixed bearing 9 is pressed in the housing 11, or against the bearing cap that is part of the housing 11, via a press fit. On the end of the shaft 5 opposite from the pinion 17, there is a rotary angle sensor 41. The pinion 17 is connected in a manner fixed against relative rotation and axially fixedly to the journal 15 via the feather keys 43 and a screw 45.

Figure 4:
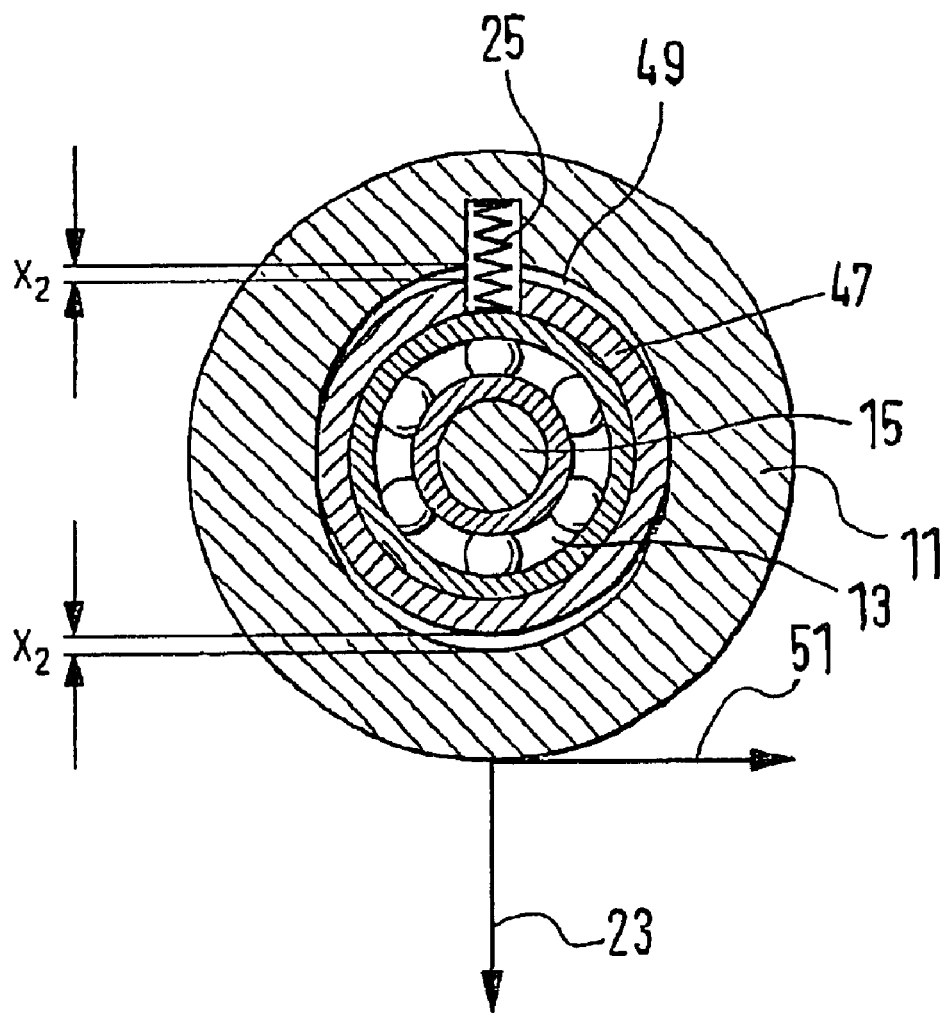
FIG. 4 is a section taken along the line A—A of FIG. 3.

FIG. 4 shows a sectional view of the movable bearing 13 taken along the line A—A. The journal 15 is supported in a support ring 47 by a deep groove ball bearing. The support ring 47 is in turn received in an oblong movable bearing 49 of the housing 11. The oblong movable bearing 49 is dimensioned such that in the radial direction, that is, in the direction of the arrow 23, the support ring 47 can be displaced by twice the distance $X_2$. That is, the pivoting distance $X_2$ is defined by the length of the oblong movable bearing 49 in the radial direction. The spring element 25 acts either directly on the outer ring of the movable bearing 13 or indirectly via the support ring 47 on the shaft 5. In the tangential direction—represented here by an arrow 51—the oblong movable bearing 49 is dimensioned such that the support ring 47 fits without play into the oblong movable bearing. The spring element 25 simultaneously serves as a rotation preventer, to prevent the support ring from rotating in the oblong movable bearing 49. The invention contemplates other embodiments that are play-free in the tangential direction and that in the radial direction allow a displacement of the support ring 47 by twice the amount $X_2$.

The invention and its usability are not limited to worm gears and spur-toothed spur gears with external toothing as in the exemplary embodiments; it can also be used in spur gears with internal toothing, bevel gears, planetary gears, or spiral gears. The invention is also usable in rack-and-pinion gears.

The foregoing relates to preferred exemplary embodiments of the invention, it being understood that other variants and embodiments thereof are possible within the spirit and scope of the invention, the latter being defined by the appended claims.

We claim:

1. A gear assembly for a vehicle steering system, comprising:
    a pinion (17) disposed on a shaft (5) in a manner fixed against relative rotation,
    a gear wheel (19) which meshes with the pinion (17),
    the pinion (17) and gear wheel (19) being prestressed in the radial direction,
    a housing,
    the shaft (5) being supported pivotably in the radial direction (23) and supported by means of a fixed bearing (9) and a movable bearing (13) that is displaceable in the radial direction (23) in the housing whereby the shaft (5) is pivotable about the fixed bearing (9), and
    at least one spring element (25) between the housing (11) and the movable bearing (13) or a support ring (47) for the movable bearing (13),
    the shaft (5) being the rotor shaft of an electric motor, and the pinion (17) being cantilevered on a journal (15) of the shaft (5).

2. The gear of claim 1, wherein the fixed bearing (9) about which the shaft (5) is pivotable is located on the side of the electric motor that is remote from the journal (15), while the movable bearing (13) is located on the other side of the electric motor.

3. The gear of claim 1, wherein the housing (11) comprises an oblong movable bearing (49) for receiving the movable bearing (13); and wherein the longitudinal axis of the oblong movable bearing (49) extends in the radial direction (23).

4. The gear of claim 2, wherein the housing (11) comprises an oblong movable bearing (49) for receiving the movable bearing (13); and wherein the longitudinal axis of the oblong movable bearing (49) extends in the radial direction (23).

5. The gear of claim 1, wherein the spring element (25) comprises a spiral spring or a cup spring.

6. The gear of claim 2, wherein the spring element (25) comprises a spiral spring or a cup spring.

7. The gear of claim 3, wherein the spring element (25) comprises a spiral spring or a cup spring.

8. The gear of claim 1, further comprising a rotation preventer mounted between the movable bearing (13) and the housing (11), or between the support ring (47) and the housing (11).

9. The gear of claim 2, further comprising a rotation preventer mounted between the movable bearing (13) and the housing (11), or between the support ring (47) and the housing (11).

10. The gear of claim 3, further comprising a rotation preventer mounted between the movable bearing (13) and the housing (11), or between the support ring (47) and the housing (11).

11. The gear of claim 5, further comprising a rotation preventer mounted between the movable bearing (13) and the housing (11), or between the support ring (47) and the housing (11).

12. The gear of claim 1, wherein the shaft (5) is supported in the housing (11) with slide bearings and/or roller bearings, preferably deep groove ball bearings or self-aligning ball bearings.

13. The gear of claim 2, wherein the shaft (5) is supported in the housing (11) with slide bearings and/or roller bearings, preferably deep groove ball bearings or self-aligning ball bearings.

14. The gear of claim 3, wherein the shaft (5) is supported in the housing (11) with slide bearings and/or roller bearings, preferably deep groove ball bearings or self-aligning ball bearings.

15. The gear of claim 8, wherein the shaft (5) is supported in the housing (11) with slide bearings and/or roller bearings, preferably deep groove ball bearings or self-aligning ball bearings.

16. The gear of claim 1, wherein the gear assembly comprises a worm gear, a spur gear with external toothing or internal toothing, a spur gear with a rack, a bevel gear, a planetary gear, or a spiral gear.

17. The gear of claim 2, wherein the gear assembly comprises a worm gear, a spur gear with external toothing or internal toothing, a spur gear with a rack, a bevel gear, a planetary gear, or a spiral gear.

18. The gear of claim 3, wherein the gear assembly comprises a worm gear, a spur gear with external toothing or internal toothing, a spur gear with a rack, a bevel gear, a planetary gear, or a spiral gear.

19. The gear of claim 8, wherein the gear assembly comprises a worm gear, a spur gear with external toothing or internal toothing, a spur gear with a rack, a bevel gear, a planetary gear, or a spiral gear.

20. A servo unit of an electric power steering system, in a rack-and-pinion steering gear, in a steering actuator, in an overriding gear, and/or as a steering actuator of a steer-by-wire steering system, comprising:

a pinion (17) disposed on a shaft (5) in a manner fixed against relative rotation, a gear wheel (19) which meshes with the pinion (17), the pinion (17) and gear wheel (19) being prestressed in the radial direction, a housing, the shaft (5) being supported pivotably in the radial direction (23) and supported by means of a fixed bearing (9) and a movable bearing (13) that is displaceable in the radial direction (23) in the housing whereby the shaft (5) is pivotable about the fixed bearing (9), and at least one spring element (25) between the housing (11) and the movable bearing (13) or a support ring (47) for the movable bearing (13), the shaft (5) being the rotor shaft of an electric motor, and the pinion (17) being cantilevered on a journal (15) of the shaft (5).

* * * * *